United States Patent [19]
Wasson et al.

[11] Patent Number: 6,065,894
[45] Date of Patent: May 23, 2000

[54] BREAKAWAY POST CONNECTOR

[76] Inventors: Lance David Wasson, 38A Asquith St., Oatley. N.S.W.; Gary James Melrose, 86 Valentia Ave., Lugarno. N.S.W. 2210., both of Australia

[21] Appl. No.: 08/981,786
[22] PCT Filed: Jul. 10, 1996
[86] PCT No.: PCT/AU96/00432
    § 371 Date: May 6, 1998
    § 102(e) Date: May 6, 1998
[87] PCT Pub. No.: WO97/03251
    PCT Pub. Date: Jan. 30, 1997

[30] Foreign Application Priority Data

Jul. 10, 1995 [AU] Australia .............................. PN 4084

[51] Int. Cl.[7] ................................................. E01F 15/00
[52] U.S. Cl. ...................... 403/2; 404/6; 52/98; 248/900
[58] Field of Search ................................ 403/2; 404/6, 9; 52/98, 99; 248/900, 548

[56] References Cited

U.S. PATENT DOCUMENTS 3,349,531 10/1967 Watson .
3,355,998 12/1967 Roemisch .
3,381,427  5/1968 Watson .
3,623,286 11/1971 Parduhn .
4,021,977  5/1977 Deike .

FOREIGN PATENT DOCUMENTS 1847770  2/1972 Australia .
B2322177  2/1972 Australia .
4029685  9/1985 Australia .
2165299  8/1973 France .
 572131  1/1976 Switzerland .

*Primary Examiner*—Lynne H. Browne
*Assistant Examiner*—David E. Bochna
*Attorney, Agent, or Firm*—Birch, Stewart, Kolasch & Birch, LLP

[57] ABSTRACT

A coupling unit for connecting respective segments of a roadside post includes respective end portions (20a,20b) adapted to engage in or about the segments and an intermediate fracture zone (45) in which the coupling unit divides to cause the post segments to separate when the assembled post is subjected in situ to a vehicle impact greater than a predetermined severity.

47 Claims, 3 Drawing Sheets

BREAKAWAY POST CONNECTOR

FIELD OF THE INVENTION

This invention relates generally to the provision of roadside structures including posts, vehicle barriers, crash cushions, furniture, sign support systems, and light pole systems, and is concerned in particular with the posts used to support such structures. The invention is described herein with specific reference to roadside vehicle barriers but it will be understood that it has much broader application.

BACKGROUND ART

A widely used form of roadside vehicle barrier, commonly known as a crash barrier, consists of one or more, often two, steel rails of generally W cross-section supported by a line of posts and usually tensioned by inclined cables stayed by the end posts. Steel crash barriers have been known in the past to pierce into vehicles impacting the barriers end-on, with potentially horrific consequences for the occupants. To prevent such consequences, it is required by regulatory authorities in Australia that a prescribed initial number of posts at each end must be a specific and exact form of timber designed to snap in two when the barrier is subjected to vehicle impact greater than a predetermined severity. Snapping of the end posts allows the barrier to collapse away from rather than pierce the vehicle, while still absorbing its impact and slowing it down. The remaining intervening posts may be simple steel posts, eg of C-section channel.

SUMMARY OF THE INVENTION

It is an object of this invention to provide a novel coupling unit. In a preferred aspect of the invention, it is an object to provide a post assembly which may be adapted in one application to use as a snap-away end post in roadside vehicle barriers in substitution for the timber post typically now utilised.

The invention accordingly provides, in a first aspect, an integrally moulded coupling unit for connecting respective upper and lower segments of a roadside post, including respective end portions adapted to engage in or about the segments and an intermediate fracture zone defined in part by slot means which extends through the unit, in which fracture zone, the coupling unit divides to cause the upper post segment to break away from the lower post segment when the assembled roadside post is subjected in situ to a vehicle impact greater than a predetermined severity.

In accordance with a further aspect, the present invention also provides. an integrally moulded coupling unit for connecting respective upper and lower segments of a roadside post, including respective end portions adapted to engage in or about the segments, and an intermediate fracture zone, the respective end portions and the intermediate fracture zone having a general H cross-section including a central web means spacing a pair of flanges, said intermediate fracture zone being defined in part by slot means which extends fully through said central web means whereby the coupling unit divides completely in said fracture zone to cause the upper post segment to break away from the lower post segment when the assembled roadside post is subject in situ to a vehicle impact greater than a predetermined severity.

The present invention also anticipates providing a roadside post including an upper post segment, a lower post segment adapted to be secured in or on the ground adjacent a roadside and an integrally moulded coupling unit as defined in the two preceding paragraphs operably connected to the upper and the lower post segments.

In a preferred embodiment, the slot means extends through the central web means fully from one of the flanges to the other of said flanges. Conveniently, the central web means may be tapered along its length from a position adjacent each said flange towards an intermediate position along the central web means. Preferably, a groove is formed on an outer face of each said flange in the fracture zone.

In a still further preferred embodiment, a bore may be provided passing through the central web means with the bore being adapted to receive a tensioning cable. Preferably, an annular boss surrounds the aforementioned bore and slots are provided through the boss forming an extension of the slot means in the central web means. Conveniently, a free face of the annular boss is located in the same plane as edges of the flanges whereby a large force transmitting washer may be used in association with the aforementioned tensioning cable to spread forces applied to the cable across the free end of the boss and the pair of flanges.

Preferably, the coupling unit may be integrally moulded from a material selected from nylon; polypropylene; thermoplastic polyester including polyethylene terephthalate and polybutylene terephthalate; thermoplastic polyurethane and its alloys; polyethylene; and thermosetting compounds including polyesters, epoxies and modifications thereof. Conveniently, the fracture zone may include one or more weld or knit lines adjacent said slot means. The material of the coupling unit may include reinforcing fibres and to assist with fracture of the coupling unit in the fracture zone, the reinforcing fibres may be predominantly oriented in a predetermined direction. The reinforcing fibres may be glass fibres having a length of at least 5 mm.

The coupling unit may also be preformed with apertures to receive bolts or other fastening means for securing the post segments to the coupling unit. The coupling unit may also include integrally formed spacer means adapted to engage and space ends of the upper and the lower post segments.

Finally, the present invention also anticipates providing a crash barrier assembly including one or more impact rails supported by a plurality of posts, at least one end post of the crash barrier assembly being formed by a post assembly as defined in the preceding paragraphs and wherein the respective end portions and the fracture zone of the coupling unit have a general H crosssection including a central web means spacing a pair of flanges, the slot means being formed in the central web means within the fracture zone and the pair of flanges extending generally parallel to said one or more impact rails. By such an arrangement it has been found that if a vehicle impacts the crash barrier endon or substantially end-on above a predetermined severity level, the connector unit completely fractures in the fracture zone permitting the impact rails to plastically deform and readily collapse away from the vehicle rather than to potentially pierce the vehicle, while still absorbing some impact energy of the vehicle. The end post or posts still, however, require a certain degree of impact resistance in a direction generally transverse or perpendicular to the impact rail or rails so as to have the capability of absorbing glancing impact blows by a vehicle. However, it is also desirable for the end post (or posts) to fracture completely even under glancing or similar impact blows at certain impact severity levels albeit much higher impact severity levels than experienced via an end-on collision with the barrier. The general H-configuration of the connector unit together with other features of the fracture zone as described above permit this to be achieved.

Several preferred embodiments of the present invention will now be described with reference to the accompanying drawings.

DESCRIPTION OF PREFERRED EMBODIMENTS

Figure 1:
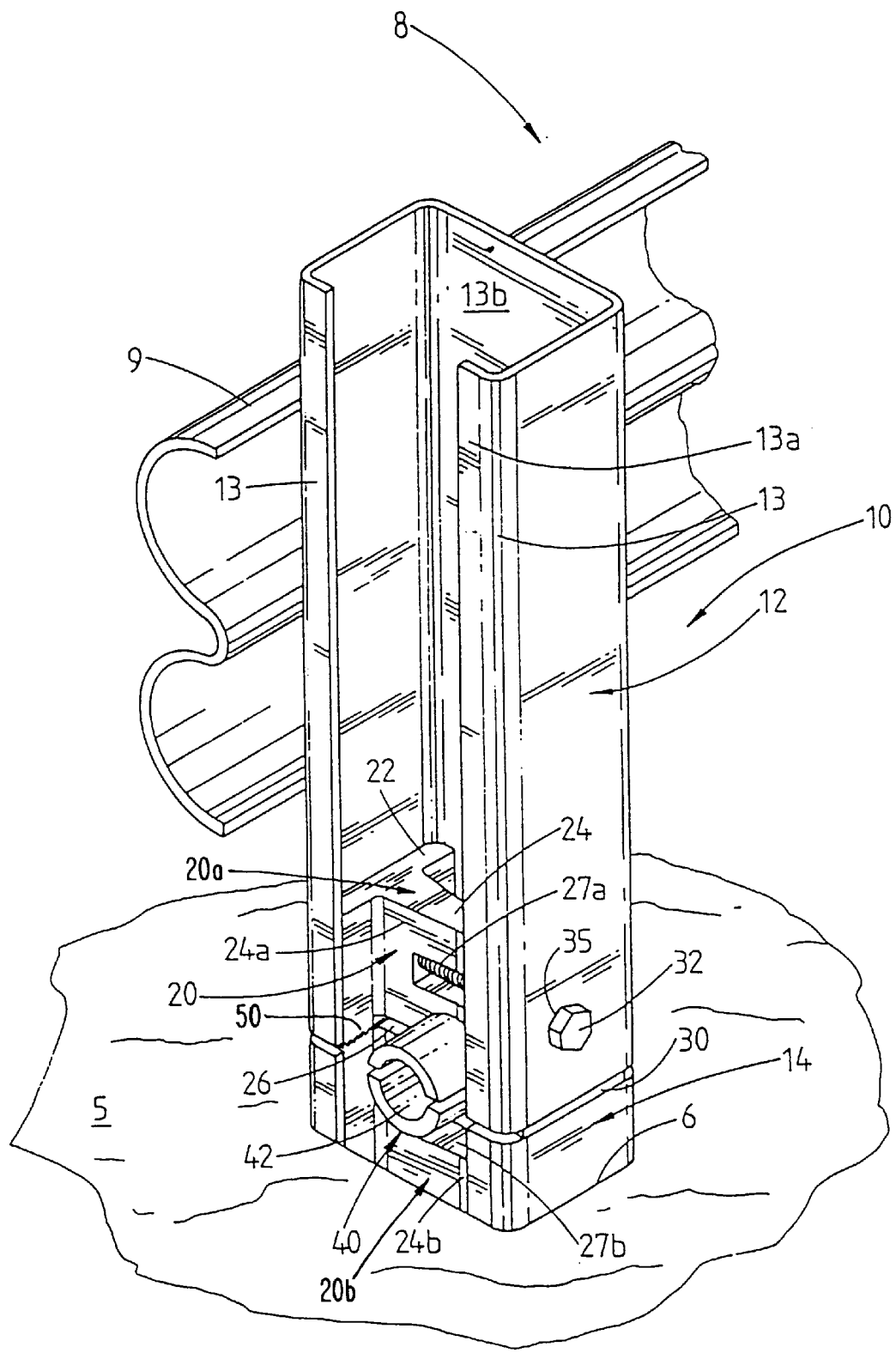
FIG. 1 is an isometric view of a one-post section of a roadside vehicle barrier incorporating posts with coupling units according to an embodiment of the invention.
Figure 2:
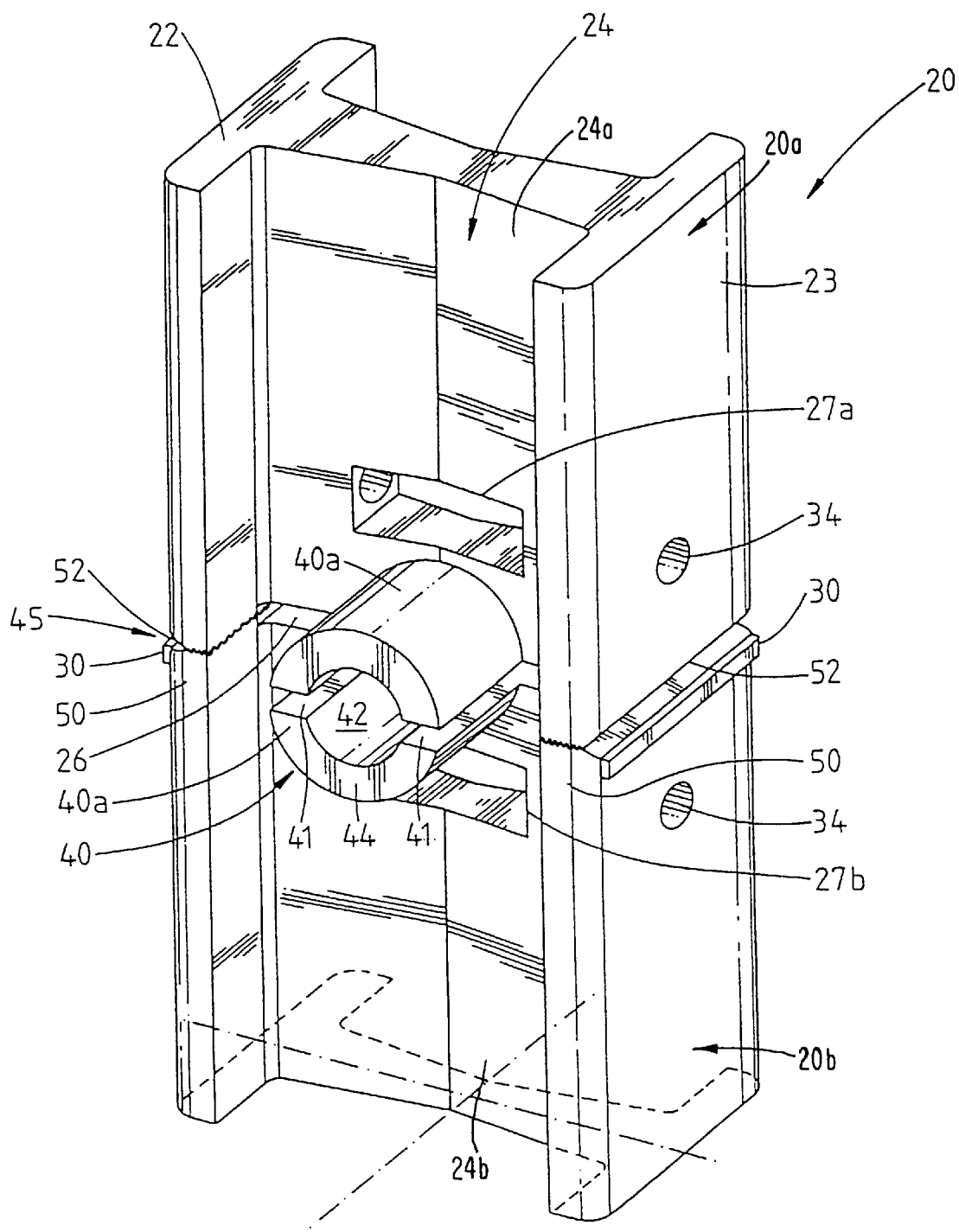
FIG. 2 is a front view of the coupling unit.
Figure 3:
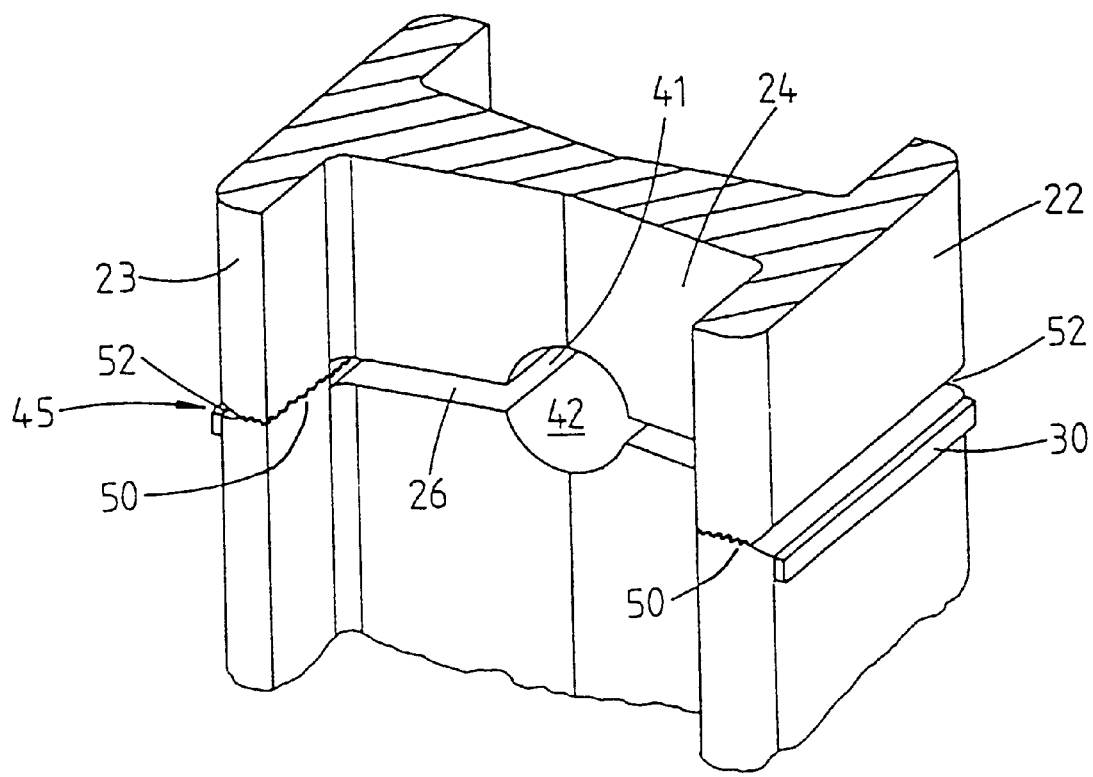
FIG. 3 is a rear sectioned view of the unit.

A typical roadside barrier 8 is illustrated in FIG. 1. The barrier has a single impact rail 9 supported from behind by a line of spaced roadside posts 10. Rail 9 is, as is common, W-section steel. Barriers of this type can have two or more impact rails.

Each post 10 includes respective upper and lower post segments 12,14 of C-section steel channel, and a coupling unit 20 for connecting post segments 12,14, integrally injection moulded in a thermoplastic material or formed-up thermosetting compound. As discussed earlier, possible alternatives for post segments 12,14 include closed channels and rolled hollow sections. Post segments 12,14 are formed in a steel channel material already widely employed for support posts of vehicle barriers but such channel is only employed at present for intermediate posts, the end posts being timber for the reasons earlier discussed. With the illustrated construction, however, roadside posts 10 can instead be employed as the end posts.

Coupling unit 20 is of general H cross-section, including flanges 22,23 and a web 24 which is divided at its longitudinal center into two equal segments 24a,24b by a transverse slot 26. Web 24 is waisted in that its cross-section is symmetrically biconically tapered.

The respective web segments 24a,24b together with the associated portions of flanges 22,23 form end portions 20a,20b which are a snug fit in post segments 12,14 being transversely retained by the return lips 13 present on the post segments by virtue of their C-section. The coupling unit projects into the post segments until they abut opposite edges of shallow integral spacer ribs 30 centrally located on the outside faces of flanges 22,23. The three components are secured together by respective carriage bolts 32 which traverse central window cavities 27a,27b in the web segments 24a,24b, and pass through pre-formed apertures 34,35 in flanges 22,23 and in the post segments.

Typically, this assembled post 10 is positioned in situ by locating the lower post segment 14 almost wholly in a hole 6 in the ground 5 and the post segment 12 above ground.

A boss formation 40 projects integrally from one face of web 24 at slot 26, being defined by two quasi-semitubular segments 40a separated by longitudinal slots 41 of matching width to, and in register with, the web slot 26. Boss 40 defines a central coaxial aperture 42 which extends through both the boss and web 24, and an outer annular face 44 designed to be substantially flush with the outer faces 13a of post segment return lips 13. In the assembled vehicle barrier, aperture 42 may receive a tensioning cable (not shown) with a washer-type end fitting which abuts faces 13a,44. A remote end of the cable is fastened to a rail of the barrier. Alternatively, the coupling unit might be inserted in the post in the opposite orientation to that of FIG. 1, so that the boss backs up the main base web 13b of the post.

To provide for the upper post segment 14 to break away from the lower post segment 12 in the circumstance of an impact greater than a predetermined severity, slot 26 in web 24 and slots 41 of boss 40 define an intermediate fracture zone 45 in which the coupling unit divides when the post is subjected, directly or indirectly, to such a vehicle impact.

A further feature of the fracture zone is the presence of a weld line or knot line across each of the flanges 22,23 at their mid-points 50 adjacent slot 26 and spacer ribs 30. These weld or knit lines are produced by injecting the plastics melt at a central gate of the mould between the flange cavities so that the flow is outwards and upwards to form the web segments and thence into the flanges. The weld or knit lines occur where these fronts of plastic come together at the longitudinal midpoints of the flanges.

The fracture zone is still further enhanced by the provision of respective V-notch grooves 52 across the outer faces of flanges 22,23 immediately adjacent spacer ribs 30. A V-notch groove may or may not be necessary depending on the resistance required to the breaking impact forces.

A particularly satisfactory material for coupling unit 20 is nylon, including but not limited to types 6,6,6 and 6,6,6,11, 12. Other possible thermoplastic materials include polypropylene, including homopolymers, copolymers and their alloys, thermoplastic polyesters including polyethylene terephthalate (PET) and polybutylene terephthalate (PBT), thermoplastic polyurethane and its alloys, polyethylene including but not limited to low, medium and high density, modified forms and alloys. Possible thermosetting compounds include polyesters and epoxies and modifications thereof.

The material may or may not be impact modified, or provided with reinforcement, and/or with or without color or other additives.

In an alternative embodiment (not illustrated) the fracture zone is obtained by using a glass fiber-filled polyester resin in which the fibers are primarily of at least 5 mm in length, and by flowing the material into the mould at a center gate so that the material flows left and right then sharply up and down into the flange. The resultant sharp changes in orientation of the longer fibers creates the required distinct fracture zone: this change of direction need only occur locally but polyester resin is such that a fracture, once started in a local region, readily extends across the whole object. The fibers should predominantly be greater than 5 mm in length. It has been found that as the fiber length is lowered from this value, the ability to finely control the properties of the fracture zone, especially its location and yield strength, diminish.

The glass fiber-filled polyester resin is usefully derived from recycled PET which is widely employed for softdrink containers, and is amorphous.

It will be appreciated that the illustrated configuration provides an assembled post having adequate structural strength for normal use but, when subjected to a prescribed impact, allows the two post segments to part in a controlled manner. Although the invention has been described herein primarily in connection with posts for roadside vehicle barriers, it has much wider application to roadside structures in general, including without limitation crash cushions, roadside furniture, sign support systems and lighting systems.

The physical parameters of the mould material may be selected to achieve a required yield strength and impact strength in the fracture zone according to standards determined by the appropriate authorities. For example, they may be chosen to match those of the conventional breakaway timber posts presently used for the end posts of roadside vehicle barriers.

Throughout this specification, unless the context requires otherwise, the word "comprise", or variations such as "comprises" or "comprising", will be understood to imply the inclusion of a stated integer or group of integers but not the exclusion of any other integer or group integers.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An integrally moulded coupling unit for connecting respective upper and lower segments of a roadside post, including respective end portions adapted to engage in or about the segments and an intermediate fracture zone defined in part by slot means which extends through the unit by one or more weld or knit lines adjacent said slot means, in which fracture zone, the coupling unit divides to cause the upper post segment to break away from the lower post segment when the assembled roadside post is subjected in situ to a vehicle impact greater than a predetermined severity.

2. A coupling unit according to claim 1, wherein the respective end portions and the intermediate fracture zone have a general H cross-section including a central web means spacing a pair of flanges.

3. A coupling unit according to claim 2, wherein the slot means extends through the central web means fully from one of said flanges to the other of said flanges.

4. A coupling unit according to claim 2, wherein the central web means tapers along its length from a position adjacent each said flange towards an intermediate position along the central web means.

5. A coupling unit according to claim 2, wherein a groove is formed on an outer face of each said flange in the fracture zone.

6. A coupling unit according to claim 2, further including a bore passing through said central web means adapted to receive a tensioning cable.

7. A coupling unit according to claim 6, wherein an annular boss generally surrounds said bore and slots through said boss from an extension of said slot means.

8. A coupling unit according to claim 7, wherein a free face of said annular boss is located in the same plane as edges of said flanges.

9. A coupling unit according to claim 2, including integrally formed spacer means adapted to engage and space ends of the upper and lower post segments.

10. A coupling unit according to claim 1, wherein the material of said coupling unit is selected from nylon; polypropylene; thermoplastic polyester including polyethylene terephthalate and polybutylene terephthalate; thermoplastic polyurethane and its alloys; polyethylene; and thermosetting compounds including polyesters, epoxies and modifications thereof.

11. A coupling unit according to claim 10, wherein the material of said coupling unit includes reinforcing fibers, the reinforcing fibers in said fracture zone being predominantly oriented in a predetermined direction to improve fracture characteristics of the coupling unit in said fracture zone.

12. A coupling unit according to claim 1, further including apertures to receive bolts or other fastening means for securing the post segments to the coupling unit.

13. A roadside post assembly including an upper post segment, a lower post segment adapted to be secured in or on the ground adjacent a roadside and an integrally moulded coupling unit according to claim 1, operably connected to the upper and the lower post segments.

14. A crash barrier assembly including one or more impact rails supported by a plurality of posts, at least one end post of the crash barrier assembly being formed by a roadside post assembly according to claim 13.

15. A crash barrier assembly according to claim 14, wherein the respective end portions and the intermediate fracture zone have a general H cross-section including a central web means spacing a pair of flanges, the slot means being formed on said central web means within the fracture zone.

16. A post assembly according to claim 13, wherein said upper post segment is selected from a C-shaped channel section or a rectangular or square shaped section dimensioned to snugly receive respective end portions of the coupling unit.

17. A post assembly according to claim 16, wherein the upper post segment is a C-shaped channel section with a base web, two opposed side flanges extending perpendicularly from lateral edges of said base web and free flange portions extending towards one another from said side flanges.

18. A post assembly according to claim 16, wherein the lower post segment is selected from a C-shaped channel section or a rectangular or square shaped section dimensioned to snugly receive respective end portions of the coupling unit.

19. A crash barrier assembly including one or more impact rails supported by a plurality of posts, at least one end post of the crash barrier assembly being formed by a roadside post assembly according to claim 13, and wherein the respective end portions and the intermediate fracture zone have a general H cross-section including a central web means spacing a pair of flanges, the slot means being formed in said central web means within the fracture zone and the pair of flanges extending generally parallel to said one or more impact rails.

20. A crash barrier assembly according to claim 19, wherein the slot means extends through the central web means fully from one of the flanges to the other.

21. A crash barrier assembly according to claim 19, wherein a groove is formed on an outer face of each said flange within the fracture zone.

22. A crash barrier assembly according to claim 19, further including a tensioning cable and a bore passing through said central web means receiving said tensioning cable.

23. A crash barrier assembly according to claim 22, wherein an annular boss generally surrounds said bore and slots through said boss from an extension of said slot means within the fracture zone of the coupling unit.

24. A crash barrier assembly according to claim 23, wherein a free face of said annular boss is located in the same plane as edges of said flanges.

25. An integrally moulded coupling unit for connecting respective upper and lower segments of a roadside post, including respective end portions adapted to engage in or about the segments, and an intermediate fracture zone, the respective end portions and the intermediate fracture zone having a general H cross-section including a central web means spacing a pair of flanges, said intermediate fracture zone being defined in part by slot means which extends fully through said central web means and by one or more weld or knit lines adjacent said slot means whereby the coupling unit divides completely in said fracture zone to cause the upper post segment to break away from the lower post segment when the assembled roadside post is subject in situ to a vehicle impact greater than a predetermined severity.

26. A coupling unit according to claim 25, wherein the slot means extends through the central web means fully from one of said flanges to the other of said flanges.

27. A coupling unit according to claim 25, wherein the central web means tapers along its length from a position adjacent each said flange towards an intermediate position along the central web means.

28. A coupling unit according to claim 25, wherein a groove is formed on an outer face of each said flange in the fracture zone.

29. A coupling unit according to claim 25, further including a bore passing through said central web means adapted to receive a tensioning cable.

30. A coupling unit according to claim 29, wherein an annular boss generally surrounds said bore and slots through said boss from an extension of said slot means.

31. A coupling unit according to claim 30, wherein a free face of said annular boss is located in the same plane as edges of said flanges.

32. A coupling unit according to claim 25, wherein the material of said coupling unit is selected from nylon; polypropylene; thermoplastic polyester including polyethylene terephthalate and polybutylene terephthalate; thermoplastic polyurethane and its alloys; polyethylene; and thermosetting compounds including polyesters, epoxies and modifications thereof.

33. A coupling unit according to claim 32, wherein the material of said coupling unit includes reinforcing fibers, the reinforcing fibers in said fracture zone being predominantly oriented in a predetermined direction to improve fracture characteristics of the coupling unit in said fracture zone.

34. A coupling unit according to claim 25, further including apertures to receive bolts or other fastening means for securing the post segments to the coupling unit.

35. A coupling unit according to claim 25, including integrally formed spacer means adapted to engage and space ends of the upper and lower post segments.

36. A roadside post assembly having the integrally mounted coupling unit according to claim 25, and further including an upper post segment and a lower post segment, the lower post segment being adapted to be secured in or on the ground adjacent a roadside, and said integrally moulded coupling unit being operably connected to the upper and the lower post segments.

37. A post assembly according to claim 36, wherein said upper post segment is selected from a C-shaped channel section or a rectangular or square shaped section dimensioned to snugly receive respective end portions of the coupling unit.

38. A post assembly according to claim 37, wherein the upper post segment is a C-shaped channel section with a base web, two opposed side flanges extending perpendicularly from lateral edges of said base web and free flange portions extending towards one another from said side flanges.

39. A post assembly according to claim 37, wherein the lower post segment is selected from a C-shaped channel section or a rectangular or square shaped section dimensioned to snugly receive respective end portions of the coupling unit.

40. A crash barrier assembly including one or more impact rails supported by a plurality of posts, at least one end post of the crash barrier assembly being formed by a roadside post assembly according to claim 36.

41. A crash barrier assembly according to claim 40, wherein the slot means is formed on said central web means within the fracture zone of the coupling unit.

42. A crash barrier assembly including one or more impact rails supported by a plurality of posts, at least one end post of the crash barrier assembly being formed by a roadside post assembly according to claim 36, and wherein the slot means is formed in said central web means within the fracture zone of the coupling unit and the pair of flanges extend generally parallel to said one or more impact rails.

43. A crash barrier assembly according to claim 42, wherein the slot means extends through the central web means fully from one of the flanges to the other.

44. A crash barrier assembly according to claim 42, wherein a groove is formed on an outer face of each said flange within the fracture zone.

45. A crash barrier assembly according to claim 42, further including a tensioning cable and a bore passing through said central web means receiving said tensioning cable.

46. A crash barrier assembly according to claim 45, wherein an annular boss generally surrounds said bore and slots through said boss from an extension of said slot means within the fracture zone of the coupling unit.

47. A crash barrier assembly according to claim 46, wherein a free face of said annular boss is located in the same plane as edges of said flanges.

* * * * *